Oct. 11, 1966  J. A. F. SUNNEN  3,277,631
PROCESS AND APPARATUS FOR SEPARATION OF A GAS MIXTURE
Filed Nov. 5, 1963  3 Sheets-Sheet 1

INVENTOR
JEAN SUNNEN
BY
ATTORNEYS

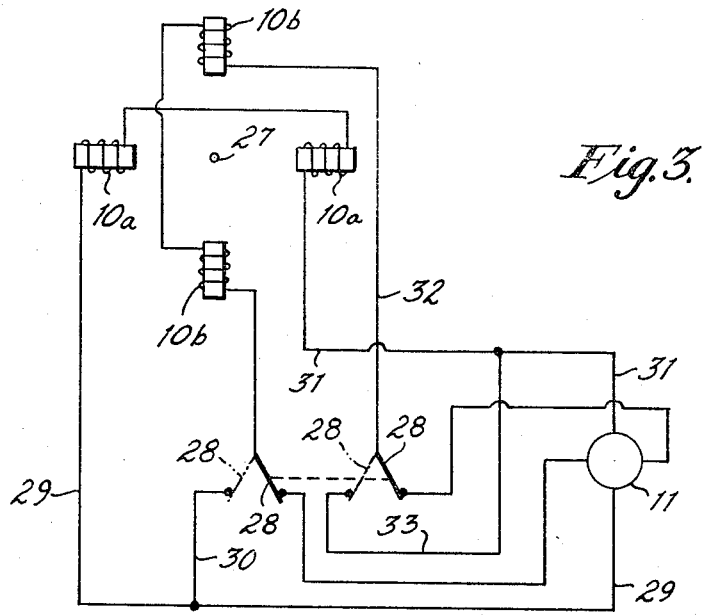
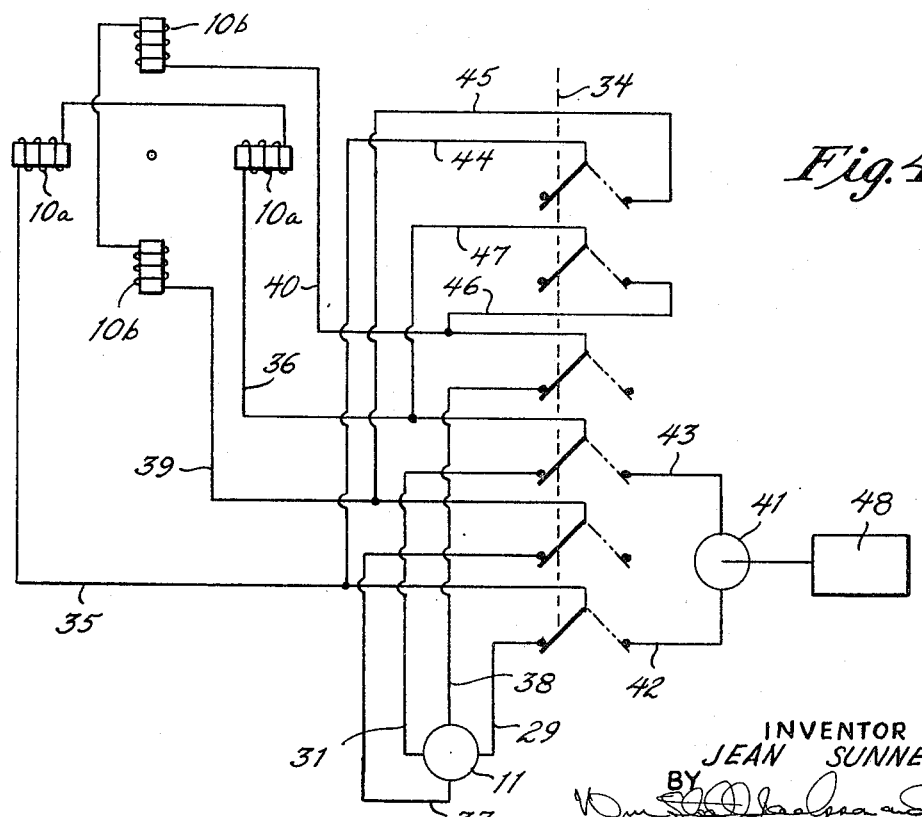

United States Patent Office 3,277,631
Patented Oct. 11, 1966

3,277,631
PROCESS AND APPARATUS FOR SEPARATION OF A GAS MIXTURE
Jean Albert François Sunnen, Brussels, Belgium, assignor to La Soudure Electrique Autogene, Procedes Arcos, Brussels, Belgium, a corporation of Belgium
Filed Nov. 5, 1963, Ser. No. 321,525
Claims priority, application Belgium, Nov. 28, 1962, 500,110, Patent 625,446
7 Claims. (Cl. 55—3)

The present invention relates to a process and apparatus for separating gases which are fed under pressure into a chamber having a wall shaped as a surface of revolution in which the gas mixture is ionized, with the stream of ionized gases being subjected to the action of a magnetic field rotating around the axis of revolution, and collecting separately co-axial layers of ionized gases obtained as a result of the centrifugation.

Prior to separating the constitutents of a gas mixture fed under pressure, it has been proposed to effectuate separation of ions having different masses and different electric charges under low pressure by subjecting the ions to the simultaneous action of an electric field and of a magnetic field according to the principles of mass spectrometry and by deflecting the ions toward catchers. In processes of this type, the operating pressure must be kept very low, for example of the order of $10^{-4}$ millimeter of mercury.

Such processes have not been made industrially because they would require vacuum pumps of huge output, in order to treat large volumes of gas.

This difficulty does not exist in a process for separating a mixture of two ionized gases under atmospheric pressure or higher, in which a given region of the gas mixture is subjected to a radial electric field which ionizes said mixture, and to a rotating magnetic field which causes such mixture thus ionized to rotate.

In a process of this character, the ionization is obtained by a diffuse radial current discharge under a very high voltage, ranging 10,000 volts per centimeter of spacing between the co-axial cylindrical walls in a refractory material containing the charged conductors. Such walls contact each other at their ends to form an annular chamber.

The gas mixture under pressure is fed through the inner wall of small diameter of such chamber, at approximately mid-length of the chamber. Under the centrifugation effect upon the mixture, the heaviest ions would concentrate near the outside wall, escape through an aperture provided near said wall in one end of said chamber, while the lightest ions, which necessarily concentrate near the inner wall, escape through an aperture provided in said wall near the opposite end of the chamber.

One of the disadvantages resulting from the use of such high voltages is that they are dangerous to the operator. Another drawback is the difficulty in insulating the device. This is true because the refractory walls of the chamber are in contact with the gas having a temperature of several thousand degrees centigrade. At such a temperature, the electrical conductivity of the refractory materials is not negligible. Such difficulties do not exist when the ionization is obtained in a manner known per se, by an electric field whose lines of force close outside the region where the ionization takes place. However, the application of a rotating magnetic field to the region where an ionizing field of this kind exists does not make it possible to cause rotation of the gas ionized by the ionizing field.

The invention has for its purpose a process by which gases of different densities can be centrifuged without causing the difficulties referred to above.

In the processes of the invention, after ionizing a gas stream under pressure, which stream moves parallelly to the axis of revolution, by means of an ionizing field whose lines of force close outside of the region where ionization takes place, the ionized gases are centrifuged in the manner referred to by means of a rotating magnetic field applied outside of the region where the ionizing field is acting.

The peripheral layer of the heaviest gases which concentrate near the inside surface of the said chamber in which they revolve is not separated in a definite manner from the layer containing the lightest gases which are compelled to concentrate near the axis of rotation of the rotating field.

In the co-axial layers between said heaviest gases and said lightest gases, there are still mixtures of variable portions of gases of different densities. In order to permit collecting gases of greater purity, successive peripheral collections can be made along the path followed by the ionized gas stream which moves parallel to the axis of rotation of the rotating magnetic field.

The gases which are not collected at a given location thus have a chance to separate better from one another before they reach the spot where the next peripheral collection will take place.

Furthermore, if the rotating speed of the gas mixture has been reduced too much when passing from one collection location to another, the speed can be built-up again to a desired higher value by subjecting the ionized gas stream to successive action of different rotating magnetic fields.

Finally, according to another feature of the process of the invention, when applied to separating elements of nearly identical masses, the ionized gas stream can be subjected to the action of a rotating magnetic field whose rotating speed is varied. A suitable increase in the rotating speed then serves to obtain separation between such elements.

The invention also contemplates a device for separating gases of different densities which are contained in a gas mixture fed under pressure in a chamber whose sidewall is shaped as a surface of revolution, comprising means for ionizing the gas mixture, means for applying a magnetic field along the path followed by the gas mixture and rotating around the axis of revolution of the sidewall and having apertures in the cylinder to collect separately the different co-axial layers of ionized gases resulting from the centrifugation of said mixture.

The device of the invention contemplates providing means to remove the gas mixture parallel to the axis of revolution, means to create an ionizing field whose lines of force close outside of the region where ionization takes place, as well as means to create a rotating magnetic field arranged to locate the latter said field outside of the region where the electric ionizing field exists.

The device of the invention advantageously includes on the one hand, windings fed with polyphase currents of commercial frequency and, on the other hand, a winding fed with curernt from a single-phase current generator provided with means to vary the frequency of said current.

In this manner, after rotating motion of the previously ionized gas stream has been obtained at low cost, the rotation can be maintained and optionally increased in speed.

Other features and details of the invention will become clear by describing the drawings attached to the present application, and which illustrate, by way of example only, various embodiments of the device to separate gases as per the invention.

FIGURE 3 is an electrical diagram showing means to feed coils to create a rotating magnetic field, from a source of two-phase alternating current for the starting period, and from a source of single-phase alternating current after starting.

FIGURE 4 is another electrical diagram showing a means for creating a rotating magnetic field first from two-phase alternating current and later from single-phase alternating current of variable frequency.

In these various figures like notations refer to identical features.

Figure 1:
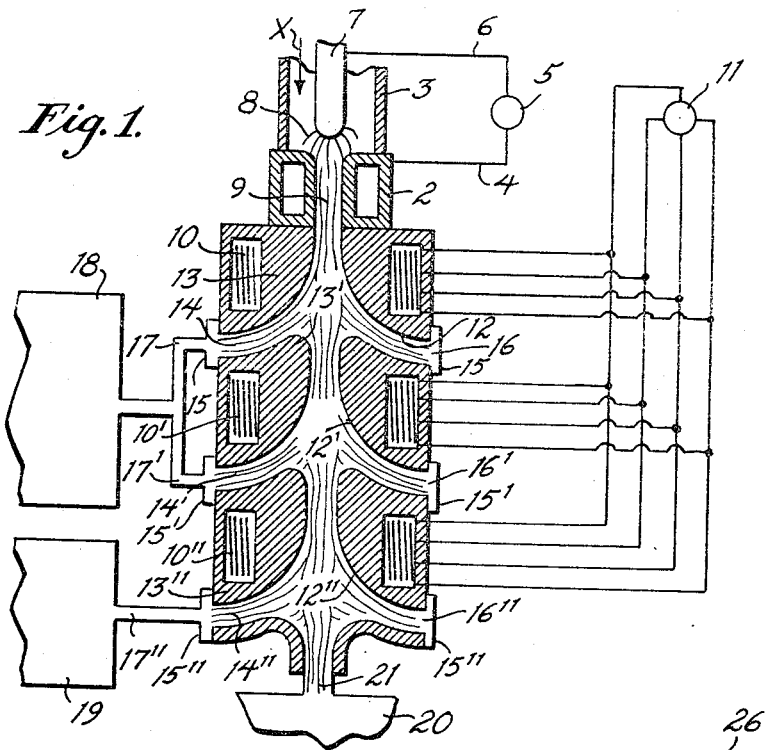
FIGURE 1 illustrates schematically an axial section through a first embodiment of the separating device of the invention, in which various magnetic fields are created by feeding coils with current from a source of two-phase alternating current.

In FIGURE 1 a device is shown which will separate gases contained in a gas mixture fed under pressure in a direction parallel to the axis of a hollow electrode 2, having an axial chamber whose peripheral surface is shaped as a surface of revolution.

A mixture is fed into this chamber through a tube 3 and the build-up of pressure is shown schematically by arrow X. The electrode 2 is connected by a wire 4 to an electric current generator 5 which is also connected by a wire 6 to a solid electrode 7 extending in the direction of and along the axis of the said surface of revolution near the upper end of said chamber.

The generator 5 delivers direct current or alternating current when an arc 8 strikes between electrodes 2 and 7.

The electric field created by this arc ionizes the gas mixture which is blown axially. Its lines of force close outside the region where ionization takes place.

The ionized plasma 9 so created leaves the region where the electric arc strikes and penetrates in a region where a magnetic field rotating around the axis of revolution is created by the passage of polyphase alternating currents through windings whose axes are in a single plane perpendicular to the axis of the cylinder and which cross at a single point on said axis. This means for creating a magnetic field rotating at a speed proportional to the frequency of the polyphase alternating currents is well known. To simplify FIGURE 1, a section of the said windings has been illustrated as if they were annular. Said windings are designated by 10 and they are fed with two-phase alternating currents from a source 11.

Under the action of said rotating field, the gas mixture is put into rotation and the centrifugal force acts upon the gases having different densities, to produce co-axial layers. The heaviest gas concentrates near the inner face 12 to a guide 13. The inner surface of said guide is shaped as a surface of revolution which tapers out away from the hollow electrode 2. The lightest gas is compelled to concentrate near the axis of rotation, despite the fact that it is also subjected to centrifugal forces.

The peripheral layer escapes through a collection ring 14 which communicates with an annular manifold 15 by an exit aperture 16. The gas collected in said manifold is evacuated by a conduit 17 into a container 18.

The portion of the ionized gas mixture which is not collected penetrates into a second guide 13', similar to guide 13. Windings 10', similar to windings 10 and also fed with two-phase alternating currents from the alternator 11, create a new rotating magnetic field in a region where the ionized plasma stream not collected at the exit of ring 14 is also outside of the region where the ionization takes place. The action of the centrifugal force upon this plasma is thus reinforced in order to better separate the heaviest gas from the rest of the mixture. The new peripheral layer which concentrates along the inner tapering face 12' to guide 13' is collected in a manifold 15' and then exits through aperture 16' of the collecting ring 14' and is lead by a conduit 17' toward container 18.

The reference notations 10" and 12" to 17" designate parts corresponding to parts 10 and 12 to 17, and the first group of said parts is used to apply an additional rotating field to the portion of the stream not collected by ring 14', as well as to separate the layer of the heaviest gas to send it into container 19. As for the lightest portion of the initial mixture, it is led into a container 20 by a conduit 21 whose axis is coincident with the axis of rotation of the rotating fields which have acted in succession upon the ionized gas mixtured.

If it is feared that the speed of rotation of the gas mixture, which is caused to revolve by the rotating magnetic field, is not close enough to the speed of rotation of the field as a result of slippage similar to that of a rotor in an induction motor, one can establish concordance with a rotating speed of the rotating field by using known means for this purpose, for example by creating a magnetic field and installing an auxiliary winding causing the passage of a low amperage direct current closing its circuit in the ionized gas in a plane containing the axis of revolution of the rotating field.

Figure 2:
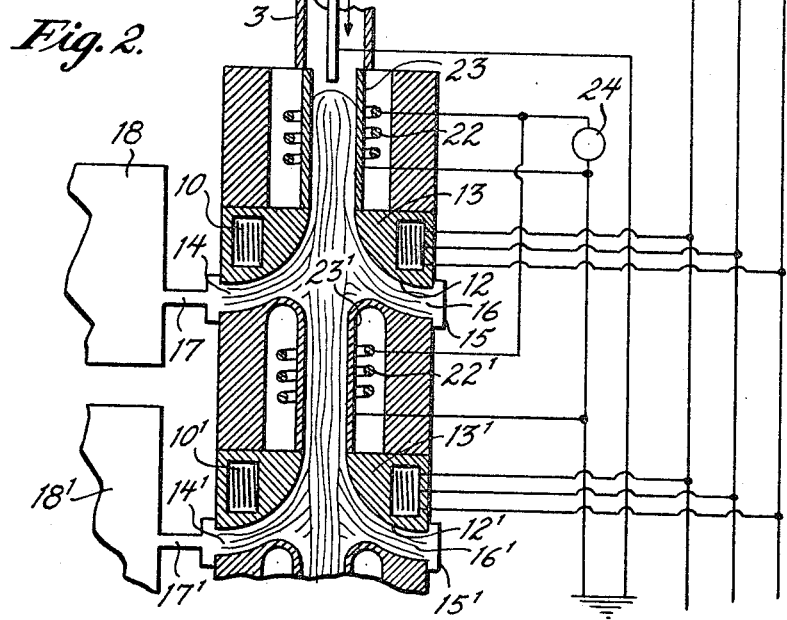
FIGURE 2 illustrates in a similar view another embodiment of the invention in which ionized magnetic fields are created by a high frequency alternating current, said fields alternating with rotating magnetic fields created by coils fed with three-phase alternating currents.

In the device of FIGURE 2, the ionization of the gas mixture is no longer obtained from an electric field as in FIGURE 1, but instead is caused by a magnetic field resulting from the passage of a high frequency alternating current through a coil 22 which surrounds a quartz tube 23. A high frequency alternating generator 24 is used.

To facilitate the creation of the ionized plasma, one can introduce temporarily into coil 22 a starting electrode 25, for example graphite, or of a refractory metal such as tungsten.

Heating of this electrode by the induced high frequency current passing through it assists in creating the plasma which is then brought to high temperature and kept ionized by currents induced by the magnetic field.

The ionized gas stream which is pushed out from the region surrounded by the coil 22 is subjected to the action of the magnetic field revolving around the axis of the tube 23 outside of the ionizing magnetic field created inside the coil 22 and parallel to the axis of said coil.

This rotating magnetic field is obtained from the passage of three-phase currents in the coils 10 which surround the guide 13. The source of three-phase currents is at 26.

The portion of the initial gas stream not collected by ring 14 penetrates into a second quartz tube 23' surrounded by a coil 22' also carrying high frequency alternating current fed from the source 24. In the tube 23' the gas stream is thus subjected to an additional ionization in a new region not subjected to a rotating magnetic field.

When the stream of ionized gas comes out of the tube 23', it is subjected to a second rotating magnetic field in a region where the ionizing magnetic field parallel to the axis of coil 22' is no longer acting.

The peripheral gaseous layer is removed by a collecting ring 14', a manifold 15' and a conduit 17' into a container 18'. The device may include still other means for creating an ionized field and a magnetic field rotating around an axis parallel to the direction of the ionizing field, both fields acting alternately upon the gas stream in regions where only one of them is acting at a time.

The circuit diagram of FIGURE 3 shows how radial coils 10a and 10b are arranged and fed with two-phase alternating currents to create a magnetic field rotating around an axis 27 passing at the coincidence points of the axes of the coils. This arrangement corresponds, for instance, to one of the coils shown schematically at 10 in FIGURE 1. When starting, the source 11 of two-phase alternating currents feeds in series on the one hand, the diametrally opposed coils 10a and, on the other hand, the coils 10b which are also diametrally opposed but have their axes at 90° with respect to the axes of the coils 10a. Once the rotation of the magnetic field starts, it can be maintained by feeding all four coils from one only of the two phases of alternator 11 by the operation of a double-pole switch 28 from the position shown in solid lines to the position shown in dotted lines. In the latter position, the current from one of the phases passes through wires 29 and 30. Wire 29 is connected in series with the coils 10a, while wire 30 is connected by one of the contacts of the two-pole switch 28 in series with the coils 10b. The feeding circuit of these various coils is closed through wire 31 for coils 10a and through wire 32, the second contact of switch 28, wire 33 and wire 31 for coils 10b. It can be seen that the other phase of the alternator cannot deliver current at that time.

In the device shown in FIGURE 4, the start of rotation of the magnetic field is still obtained from two-phase alternating current fed by a two-phase alternator 11. One of the phases feeds the coils 10a in series through two contacts of a six-pole switch 34 when said switch is in the position shown in solid lines. The wires 29 and 31 reach the two contacts which are then connected to wires 35 and 36 leading to coils 10a.

The other phase of alternator 11 feeds the coils 10b in series through two other contacts of the switch 34 because two wires 37 and 38 connect said alternator to two other contacts leading to the coils 10b by two wires 39 and 40.

After starting the rotating field, the rotation can be maintained by means of a single-phase alternating current supplied by alternator 41, provided that the switch 34 be set in the position shown in the interrupted lines. In this position a wire 42 originating from the alternator is connected to a wire 35 while another wire 43 originating from the alternator is connected to a wire 36. The coils 10a are therefore fed by single-phase alternating current from the alternator 41. The same applies to the coils 10b because the wire 35 is connected to a wire 44 connected to a fifth contact of the switch 34. In the position shown in interrupted lines, now considered, this latter contact is connected to a wire 45 connected to the wire 39 leading to one of the coils 10b.

The other coil 10b is connected by wire 40 to another wire 46 leading to the sixth contact of the switch 34. This latter contact is connected by a wire 47 to the wire 36 leading to the switch contact then closed to wire 43.

The alternator 41 is driven by a variable speed electric motor 48 which permits progressive increase of the frequency of the single-phase alternating current. Therefore, if the rotating magnetic field has been started at low cost and low speed by means of a low frequency polyphase alternator, for instance at commercial frequency, one can later increase the rotating speed of the rotating magnetic field in order to increase the centrifugal action. With a sufficient rotating speed, it is possible to separate gases having nearly equal masses.

Figure 5:
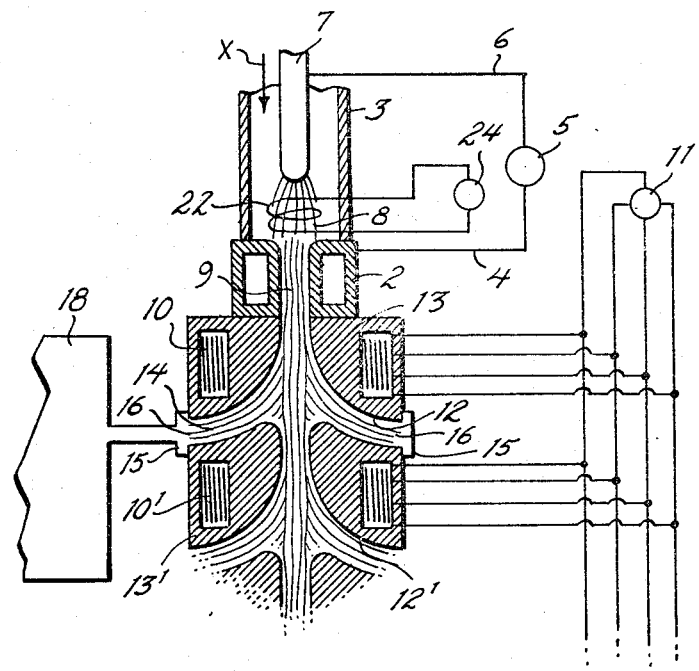
FIGURE 5 illustrates another means to ionize a gas mixture in a device as per the present invention.

In the portion of the device of the invention shown in FIGURE 5, the ionization of the gas mixture is obtained by the simultaneous use of an electric field and a magnetic field. The ionized electric field is created as in the case of FIGURE 1, by an arc striking between the electrodes 2 and 7. The ionization of the ionized plasma created in this arc is reinforced by an ionizing magnetic field created by a high frequency alternating current passing in a winding 22 surrounding the arc 8.

It is obvious that the invention is not exclusively limited to the embodiments of execution shown and that many modifications can be made in the shape, arrangement and construction of various features employed, provided that such changes do not contradict the subject matter of the claims.

It will be evident that other known means can be used to change the rotating speed of the rotating magnetic field. One can, for instance, change the number of magnetic poles in the circuit.

It is also practical to use another single-phase current generator rather than an alternator, for example an electronic generator. In an electronic generator it is very easy to progressively modify the frequency by controlling the factors which determine the frequency of oscillation.

In case the arc is struck between two electrodes, one of the electrodes can be a consumable electrode which, by its fusion and its evaporation in the arc, supplies to the gas forced into the arc one of the ingredients or elements which, after centrifugal separation, can react with another element with which it comes into contact.

It will be evident that gases, solids or liquids can be brought into contact with the ionizing gas, either along the axis of the gas stream or at the periphery of the gas stream if a physical or chemical reaction is desired.

It will further be evident that porous walls may be used to separate gaseous constituents after centrifugal separation.

In view of my invention and disclosure variations and modifications to meet individual whim or particular need will doubtless become evident to others skilled in the art, to obtain all or part of the benefits of my invention without copying the process and apparatus shown, and I therefore claim all such insofar as they fall within the reasonable spirit and scope of my claims.

Having thus described my invention what I claim as new and desire to secure by Letters Patent is:

1. A process for separating gases, using a chamber whose side wall is shaped as a surface of revolution, which comprises forcing mixed gases under at least atmospheric pressure into the chamber, ionizing the gases by an ionizing field whose lines of force close outside the region where ionization takes place, progressing the ionized gases through the chamber in the direction of the axis of revolution, applying to the ionized gas stream outside of the ionizing field a plurality of successive different rotating magnetic field spaced from one another and located at different points along the chamber, and separating from the stream and collecting a peripheral layer after each rotating magnetic field, the remaining portion of the ionized gas stream being subjected to the next rotating magnetic field.

2. A process of claim 1, which comprises ionizing the gas stream at successive different locations along the chamber, each located after a rotating magnetic field, and there being no rotating magnetic field at the locations of ionizing.

3. A process of claim 2, which comprises varying the speed of rotation of each of the different rotating magnetic fields.

4. A device to separate gases of different densities contained in a gas mixture, comprising a chamber whose side wall is shaped as a surface of revolution, means for supplying a gas mixture under at least atmospheric pressure to said chamber in a direction parallel to the axis of revolution, means for producing an ionizing field for ioninzing the gas, the ionizing field having lines of force which close outside of the region where ionization takes place, a plurality of different means for setting up rotating magnetic fields at different points along the length of the chamber, which rotating magnetic fields are active outside of the region where the ionizing field exists, for rotating the gas around the axis of the chamber at various points, and a plurality of collecting means each located after a rotating magnetic field and comprising an aperture in the wall of said chamber for collecting different peripheral layers formed by the centrifugal action in the different rotating magnetic fields, the successive rotating magnetic fields acting on the remainder of the gas stream.

5. A device of claim 4, in combination with means for additionally ionizing the gas mixture beyond the first collecting means and outside of any region where a rotating magnetic field is acting.

6. A device of claim 4, in which the means for setting up the rotating magnetic fields comprises winding means, a source of polyphase alternating curent connected thereto, a source of single-phase current connected to the winding means and means for varying the frequency of the single-phase current.

7. A device of claim 6, in which the means for varying the frequency of the single-phase current comprises means to increase progressively the speed of rotation of the rotating magnetic field above the speed obtained from the polyphase alternating current.

References Cited by the Examiner

UNITED STATES PATENTS

| | | | |
|---|---|---|---|
| 2,533,966 | 12/1950 | Simmons | 55—3 X |
| 2,836,750 | 5/1958 | Weimer. | |
| 2,842,490 | 7/1958 | Friel | 204—156 |
| 3,004,158 | 10/1961 | Steimel | 55—3 X |
| 3,059,110 | 10/1962 | Japolsky | 55—3 X |
| 3,113,427 | 12/1963 | Meyer. | |
| 3,183,403 | 5/1965 | Hurwitz et al. | 103—1 |

FOREIGN PATENTS

| | | |
|---|---|---|
| 643,823 | 5/1928 | France. |
| 152,643 | 3/1921 | Great Britain. |

ROBERT F. BURNETT, *Primary Examiner.*